United States Patent
Atkinson et al.

(10) Patent No.: US 7,346,277 B2
(45) Date of Patent: Mar. 18, 2008

(54) JOINT-LAYER RESTORATION IN PACKET-OVER-OPTICAL NETWORKS

(75) Inventors: Gary W. Atkinson, Freehold, NJ (US);
Chunxiao Chigan, Houghton, MI (US);
Ramesh Nagarajan, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 541 days.

(21) Appl. No.: 10/899,496

(22) Filed: Jul. 26, 2004

(65) Prior Publication Data

US 2005/0063299 A1 Mar. 24, 2005

Related U.S. Application Data

(60) Provisional application No. 60/501,229, filed on Sep. 8, 2003.

(51) Int. Cl.
*G02F 1/00* (2006.01)
(52) U.S. Cl. .................. 398/7; 398/1; 398/5; 398/6; 398/8
(58) Field of Classification Search ............... 398/1–8
See application file for complete search history.

(56) References Cited

U.S. PATENT DOCUMENTS

| | | | |
|---|---|---|---|
| 6,463,285 B1 | 10/2002 | Davies et al. | |
| 6,530,032 B1* | 3/2003 | Shew et al. | 714/4 |
| 6,708,000 B1* | 3/2004 | Nishi et al. | 398/1 |
| 6,970,451 B1* | 11/2005 | Greenberg et al. | 370/352 |
| 7,020,078 B2* | 3/2006 | Maeno | 370/222 |
| 7,188,280 B2* | 3/2007 | Shinomiya et al. | 714/43 |
| 2002/0030864 A1* | 3/2002 | Chaudhuri et al. | 359/110 |
| 2002/0035640 A1* | 3/2002 | Greenberg et al. | 709/238 |
| 2002/0063916 A1* | 5/2002 | Chiu et al. | 359/110 |
| 2004/0107382 A1* | 6/2004 | Doverspike et al. | 714/4 |
| 2004/0186701 A1* | 9/2004 | Aubin et al. | 703/13 |
| 2006/0126500 A1* | 6/2006 | Wakai et al. | 370/218 |
| 2006/0257143 A1* | 11/2006 | Cavazzoni et al. | 398/49 |
| 2007/0041316 A1* | 2/2007 | Chaudhuri | 370/218 |

OTHER PUBLICATIONS

C. Chigan, G. Atkinson, R. Nagarajan, T. Robertazzi. "Mathematical Programming for Joint Protection/Restoration of IP over DWDM Networks". 2002 Conference on Information Sciences and Systems, Princeton University, Mar. 20-22, 2002.*

* cited by examiner

*Primary Examiner*—Kenneth Vanderpuye
*Assistant Examiner*—Thi Q. Le

(57) ABSTRACT

A joint "packet-optical" layer restoration mechanism protects against single, packet-layer router failures by managing network resources from both the packet layer and the optical transport layer in a synergistic manner. It reuses packet-layer router service-ports and/or transport-layer service wavelengths associated with optical switch-ports instead of reserving additional standby packet-layer router service-ports. It can reuse resources from primary paths that are unaffected by router failures and paths that exist for link-failure protection at the optical layer. Embodiments feature a modified node structure that includes both an IP router and a dynamically reconfigurable OXC, which dynamically establishes connectivity between IP-router ports and transport-layer optical fibers. The joint-layer router provides fine-granularity grooming at the IP layer and full-fledged wavelength networking via dynamic wavelength switching and/or wavelength translation at the optical layer. The latter can change the wavelength cross-connections on-demand to perform restoration or to modify the connectivity between IP routers in the network.

20 Claims, 6 Drawing Sheets

JOINT-LAYER RESTORATION IN PACKET-OVER-OPTICAL NETWORKS

CROSS-REFERENCE TO RELATED APPLICATIONS

This application claims the benefit of the filing date of U.S. provisional application No. 60/501,229, filed on Sep. 8, 2003.

BACKGROUND OF THE INVENTION

1. Field of the Invention

The present invention relates to optical networks and, more specifically, to restoration planning in packet-over-optical networks.

2. Description of the Related Art

A popular architecture for telecommunications networks is known as packet-over-optical. This architecture employs an optical transport layer, for example, a Synchronous Optical Network (SONET)) or frame relay layer, overlaid with a packet layer, for example, Internet protocol (IP), IP over multiprotocol label switched (MPLS), asynchronous transfer mode (ATM) or frame relay. With the deployment of high-capacity, for example, gigabit-per-second range, transmission and switching equipment within these networks, any single-link outage or single-node outage can lead to tremendous losses for both the network operators and their customers. As a result, it has become important to design these networks in such a way that they can quickly recover from network failure and restore interrupted traffic.

There are many different types of network failures, but, in a packet-over-optical network, two types of failures predominate. These are (1) failures in the optical transport layer including optical cross-connect (OXC) failures, transmitter failures, or fiber/cable cuts, and (2) failures in the packet layer including different failure modes of packet-layer routers. The failure modes of packet-layer routers include misconfiguration, processor or line-card failure, power glitches, or power-supply failure. Generally, in packet-over-optical networks, transport-layer optical cross-connect failures are much less likely than router-related failures. Indeed, anecdotal evidence from network operators suggests that router failures are responsible for up to forty percent of outages in today's packet-over-optical networks. This is because rapidly growing packet networks are faced with constant software and hardware upgrades, and routers are generally not as reliable as traditional telecommunication equipment. Typically, the optical transport layer includes mechanisms to recover from transport-layer failures, while the packet layer includes mechanisms to recover from packet-layer failures. These mechanisms include the reservation of restoration capacity for each layer.

SUMMARY OF THE INVENTION

Bandwidth inefficiencies exist when restoration capacity that is reserved in the transport layer cannot be effectively utilized to minimize the cost of recovery from, for example, router failures in the packet layer. Additionally, pure packet-layer restoration that cannot make use of restoration capacity set aside at the optical transport layer for transport-layer restoration, typically requires the reservation of expensive packet-layer service-ports, which increases the cost of service protection.

Recently, advances in generalized multiprotocol label switching (GMPLS) and extensive study and understanding of packet-over-optical network architectures, have provided facilities that make it possible to manage the resources of the packet layer and underlying optical transport layer in an interoperable manner. We have recognized that these advances open up the possibility of coordinated restoration actions across the two layers.

Thus, problems in the prior art are addressed, in accordance with principles of the present invention, by a method and apparatus for joint "packet-optical" layer restoration. The invention protects against single, packet-layer router failures by managing network restoration resources from both the packet layer and the optical transport layer in a synergistic manner. It reuses packet-layer router service-ports and/or transport-layer service-wavelengths associated with optical switch-ports instead of reserving additional standby packet-layer restoration router ports and the associated restoration wavelengths at the optical transport layer.

One embodiment of the present invention is a joint IP-optical failure restoration scheme directed to the recovery from single IP router failures in a mesh network. This embodiment reuses network resources from (1) those primary paths that are unaffected by the router failure as well as (2) those paths that exist for link-failure protection at the optical layer.

The present invention may feature a modified node structure that includes both an IP router and a dynamically reconfigurable OXC. The IP router is coupled with a "smart" OXC that dynamically establishes connectivity between different IP-router ports and the optical transport-layer "line-side" optical fibers. This joint-layer router provides fine-granularity grooming at the IP-layer and full-fledged wavelength networking via dynamic wavelength switching and/or wavelength translation at the optical layer. The latter can change the wavelength cross-connections on-demand to perform restoration or to modify the connectivity between IP routers in the network.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
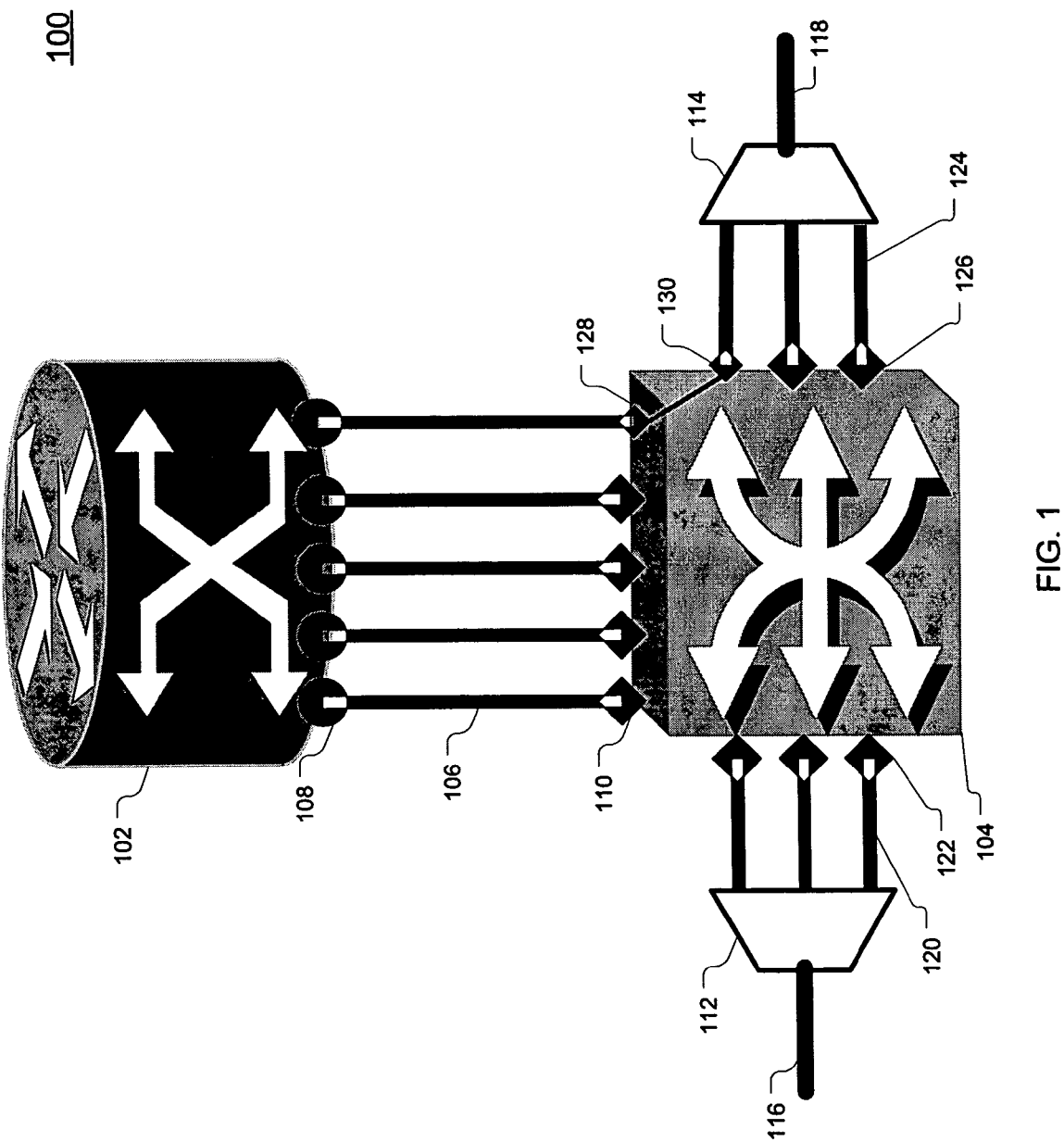
FIG. 1 illustrates the structure of a node in one embodiment of a packet-over-optical network according to the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Introduction

The present invention is applicable to a broad class of networks referred to generally as "packet-over-optical." For specificity of discussion, in specific examples that follow, the packet layer is assumed to be IP/MPLS. However, as would be understood to one skilled in the art, the invention described herein is applicable to other packet technologies as well, including asynchronous transfer mode (ATM) and Frame Relay.

Typically, in today's telecommunication networks, the optical transport layer is used to recover from transport-layer failures such as cable cuts. This is done because (1) switching can generally be more cost-efficient in the optical layer than in the IP layer due to the lower cost of optical switch-ports relative to IP-router ports (a cost multiple of 5 to 10 or more for IP ports compared to optical switch-ports is not uncommon), (2) prior to recent advances in MPLS-based IP-layer restoration mechanisms, recovery (on the order of tenths of a second) at the transport layer was much faster than recovery (on the order of minutes) at the IP layer, and (3) any single link failure may involve multiple IP-layer failures, which can complicate IP-layer recovery relative to transport-layer recovery. In short, optical-layer failure recovery is generally cheaper, faster, and simpler than packet-layer failure recovery. Thus, it has been widely preferred to protect physical-link failures using the optical transport layer rather than the IP/MPLS layer.

However, recovery mechanisms in the transport layer alone cannot efficiently protect against higher-layer faults including IP-router failures. For IP-router failures, for example, there are primarily two alternative approaches to network recovery. The first approach is a pure IP-layer recovery mechanism that is independent of the optical-layer mechanisms. Here, additional capacity is installed between the IP routers in order to enable recovery. For example, to bypass a failed router, link-detour or path-detour mechanisms are typically used. However, these mechanisms involve the reservation of additional recovery-path bandwidth. The second approach to IP-router failure recovery is an IP-layer recovery mechanism that can work in conjunction with the optical switches of the transport layer to exploit resource sharing of the network capacity provided for both primary-path recovery (at the IP layer) and optical-path recovery (at the optical transport layer). Certain embodiments of the present invention are related to the latter approach.

Note that the present discussion concerns single failures only. Thus, it is assumed that when there is an IP-router failure, there is not also a simultaneous failure in the optical transport layer. As a result, when an IP router fails, existing recovery capacity in the optical transport layer can be assumed to be intact and potentially available for use by a common IP-optical recovery mechanism to help recover from the IP-router failure. Further, IP-router ports associated with primary paths in the network can potentially be reused. This can be accomplished by changing the connectivity between IP-router ports via reconfigurable optical transport switches that are advantageously associated with each IP-router for such purposes.

Traditionally, in packet-over-optical networks, recovery is handled independently for each of the packet and optical layers. One reason for this is that, until recently, no mechanism existed to coordinate actions between the two layers. However, recent advances in generalized multiprotocol label switching (GMPLS) have made such coordination possible. In certain embodiments of the present invention, these mechanisms are utilized as part of a joint packet-optical layer restoration scheme to protect against single packet-router failures, where a restoration manager manages network resources from both the packet layer and the optical layer in a synergistic manner. Part of this management includes reuse of packet-layer router service-ports and/or transport-layer service-wavelengths associated with optical switch-ports. With careful planning, the restoration manager can recover from IP-router failures with the allocation of zero or minimal additional standby packet-layer router service-ports.

Only a handful of publications directly or indirectly address router-restoration issues in packet-over-optical networks. In one of these publications, F. Poppe, et al, "Alcatel Core Node Solution for Survivable Networks," Alcatel Telecommunications Review, 3rd Quarter, 2002, incorporated herein by reference in its entirety, an Alcatel Core Node (ACN) is described that provides a comprehensive restoration solution for IP-centric intelligent optical networks (ION). For router-failure restoration, pure IP restoration and several automatic protection switching (1:1, 1+1, or n:m) schemes are examined. The authors predict that a joint packet-optical restoration scheme would be cost-effective but do not propose such a solution. In another publication, A. L. Chiu and J. Strand, "Joint IP/Optical Layer Restoration After a Router Failure", Optical Fiber Communications Conference Proceedings, March 2001 (herein "Chiu 2001"), incorporated herein by reference in its entirety, Chiu and Strand propose a dual-homing IP-optical layer restoration method for router failures, which is suitable for a central office with a minimum of two backbone routers and an optical cross-connect. The authors present an intuitive description of a joint-layer type of router restoration scheme. However, no in-depth investigation and examinations/conclusions are provided.

There are basically two categories of IP-over-optical network architectures. One is the so-called "Big Fat Router" (BFR) architecture. In this architecture, each node is an IP router that is hard-wired to the terminators of a point-to-point optical transmission system. The optical-layer network is not reconfigurable and requires no intelligence. That is, the optical layer supports only physical hard-wired transmission between router ports. In this architecture, the IP layer manages network failure recovery. The main advantage of this architecture is the flexible statistical multiplexing and the fine granularity of traffic grooming that is performed by the IP routers. However, the ports of routers are interconnected in a relatively static configuration. Also, there is no restoration capability available at the optical layer. Assuming IP-router ports are significantly higher in cost than optical-switch ports, one of the disadvantages of this architecture is the high capital cost of systems based on this architecture when the inter-router pipes are relatively well utilized (e.g., in high-traffic situations where the architecture cannot further take advantage of the fine-granularity grooming efficiency of the packet router)

With advances in optical networking technology such as programmable add/drop multiplexers (ADMs) and dynamically reconfigurable optical cross-connect switches (OXCs), an IP-over-optical network can be alternatively architected.

Node Structure

Embodiments of the present invention feature such an alternative architecture that includes a modified node, herein referred to as a "joint-layer router," which includes both an IP router and a dynamically reconfigurable OXC. In the joint-layer router, the IP router is coupled with a "smart" OXC that dynamically establishes connectivity between different IP-router ports and the optical transport-layer "line-side" optical fibers. This joint-layer router provides the best features of both the IP and optical layers. It provides fine-granularity grooming at the IP layer and full-fledged wavelength networking via dynamic wavelength switching and/or wavelength translation at the optical layer. The latter can change the wavelength cross-connections on-demand to perform restoration or to modify the connectivity between IP routers in the network.

FIG. 1 illustrates joint-layer router 100 according to one or more embodiments of the present invention. Joint-layer router 100 has two primary components: IP router 102 and dynamically reconfigurable optical cross-connect (OXC) 104. IP router 102 is coupled to OXC 104 via a plurality of intra-node (i.e., within the joint-layer router) bidirectional optical fibers, each terminated at the IP-router end by a bidirectional IP port and at the OXC end by a bidirectional "smart optical" port. Here, the term "smart optical port" is used to refer to the physical hardware used to terminate a bi-directional optical link. The smart optical port supports dynamic, reconfigurable, switching/routing functionality within an OXC. For example, optical fiber 106 is terminated at the IP-router end by IP port 108 and at the OXC end by smart optical port 110. Each optical fiber between the IP router and the OXC can carry one or more wavelengths of light in each direction, each of which can be modulated with a digital bitstream. Each digital bitstream can constitute a multiplex of IP packets representing one or more IP connections. IP-packet multiplexes that are received by the IP router via one or more of IP ports are demultiplexed, groomed, routed, and multiplexed by the IP router and retransmitted via one or more of its IP ports. OXC 104 is additionally coupled to wavelength multiplexer/demultiplexer (mux/demux) 112 via a plurality of optical fibers and to wavelength mux/demux 114 via another plurality of optical fibers. The majority of these optical fibers are terminated at OXC 104 by a smart optical port. For example, optical fiber 120 is terminated at OXC 104 by smart optical port 122, and optical fiber 124 is terminated at OXC 104 by smart optical port 126.

Each of optical fibers 116 and 118 can carry one or more wavelengths of light in each direction, each wavelength of light modulated by a digital bitstream. Mux/demux 112 demultiplexes incoming wavelengths that are carried on optical fiber 116, outputting each wavelength onto a different one (e.g., optical fiber 120) of the plurality of optical fibers that couple mux/demux 112 to OXC 104. Mux/demux 112 also multiplexes outbound wavelengths from each (e.g., optical fiber 120) of the plurality of optical fibers from OXC 104 and combines them onto optical fiber 116 for transmission to, for example, another joint-layer router in the network. Similarly, mux/demux 114 demultiplexes incoming wavelengths that are carried on optical fiber 118, outputting each wavelength onto a different one (e.g., optical fiber 124) of the plurality of optical fibers that couple mux/demux 114 to OXC 104. Mux/demux 114 also multiplexes outbound wavelengths from each (e.g., optical fiber 124) of the plurality of optical fibers from OXC 104 and combines them onto optical fiber 118 for transmission to, for example, another joint-layer router in the network.

OXC 104 switches incoming wavelengths between its smart optical ports (e.g., smart optical ports 122, 110, and 126). IP packets that are carried on wavelengths that are switched by OXC 104 to IP router 102 are demultiplexed by the IP router from the incoming wavelengths on which they are carried, groomed (e.g., some packets may be dropped, others may be added), routed, and then multiplexed by the IP router into outbound wavelengths of light and retransmitted on one or more of its IP ports back to OXC 104.

In some cases, wavelengths carried on fibers between IP router 102 to OXC 104 are not dynamically switched by OXC 104, but are instead statically hard-routed or "patched" through the OXC. These wavelengths are carried by optical fibers that are terminated at "dummy" ports (e.g., dummy ports 128 and 130). These static cross-connections are nailed up via a patch panel and are generally not directly connected to the OXC; however, for convenience of illustration, they are show in FIG. 1 as being part of OXC 104.

Thus, with the functionality of joint-layer router 100, IP packets received at the joint-layer router can be redirected at two different layers: the optical transport layer and the IP layer. At the optical transport layer, those IP packets that are carried on a common wavelength can be switched together to the output of the joint-layer router without involvement of IP router 102. Thus, if there is a failure in the IP router, IP packets that are switched at the wavelength granularity of the OXC will be unaffected. At the IP layer, IP packets are demultiplexed, groomed, routed, and multiplexed (i.e., aggregated) by the IP router. IP packets that are demultiplexed from one input wavelength to the joint-layer router and combined with IP packets from a different wavelength before being output from the joint-layer router will be affected by failure of the IP router.

Note that, in certain embodiments, OXC 104 may have the functionality of receiving IP packets on a first wavelength on an input port and switching all of those packets to an output port at a second wavelength that is different than the first, this wavelength-translation feature may or may not be present, depending on the embodiment, but is understood to be within the scope of an OXC's capabilities. Thus, the OXC is understood to either be a pure-optical switch or an optical-electrical-optical switch capable of optical-wavelength routing and/or wavelength translation, but not, in general, IP-layer manipulations of packets. Note also that the OXC is assumed to be dynamic, thus having the ability to perform real-time switching of high-bandwidth optical wavelength channels (OChs) by appropriately reconfiguring the optical-port interconnections.

Pure-IP Layer vs. Joint IP-Optical Layer Restoration

A restoration scheme that operates purely at the IP layer can protect against both IP-router failures (via bypass of the failed IP router) and lower-layer optical failures such as fiber cuts. However, the joint IP-optical restoration scheme of the present invention goes beyond basic bypass of failed links and IP routers and attempts to maximize the reuse of expensive IP ports or service wavelengths, rather than reserve additional standby IP ports exclusively for network recovery. As an example, consider the six-node IP-over-optical mesh network illustrated by FIG. 2. Each node includes a joint-layer router of the type discussed with respect to FIG. 1. The OXCs are interconnected via optical fiber links with capacity $\lambda$. The router and the OXC co-located within a joint-layer router at node n are referred to herein as Rn and OXCn, respectively. The link between nodes n and m is referred to herein as link n-m.

Consider two end-to-end IP packet streams each requiring $\frac{1}{2}\lambda$ capacity. The first stream is sourced from router R3 and is destined for router R1, with primary path routing $$R3 \rightarrow OXC3 \rightarrow OXC2 \rightarrow R2 \rightarrow OXC2 \rightarrow OXC1 \rightarrow R1.$$

The second stream is sourced from router R3 and is destined to router R5, with primary path routing

R3→OXC3→OXC2→R2→OXC2→OXC5→R5.

Since the two streams each require only ½λ capacity, they can (1) be groomed together at the IP layer by source router R3 into a single wavelength, (2) share the same outbound-IP port 210 at the source router, the same intra-node fiber between IP router R3 and OXC3, and the same inbound optical port 222 at OXC3, and (3) be routed together at the optical layer through OXC3. Both streams thus also share the same inter-node wavelength between node 3 and node 2, the same inbound smart optical port 214 at OXC2, and the same inbound-IP port 216 at transit IP router R2. At IP router R2, the two streams are demultiplexed from the inbound wavelength and switched to distinct outbound IP-router ports (218 and 220) so that they can be switched independently to physical links (e.g., links 2-1 and 2-5, respectively) at the optical layer by OXC2. Note that, although each stream only needs ½λ capacity, an entire wavelength will be used on link 2-1 for the first stream and another entire wavelength will be used on link 2-5 for the second stream, since the smallest allocatable transmission unit at the optical layer is one wavelength. For both streams, IP router R2 plays a key role in the routing since it needs to receive the single wavelength used to carry the two streams from OXC3 to OXC2, demultiplex the streams at the IP layer, and switch the streams to separate ports for subsequent routing at the optical layer by OXC2.

IP-layer Restoration

Now suppose there is a failure at IP router R2 (with the single-failure assumption that OXC2 is not also affected). In this case, both streams are affected by the failure and have to be rerouted around the failed IP router R2 to backup paths. In the prior art, the detection of the IP router failure and the recovery from the failure would generally be limited to IP-layer mechanisms. Switching capability of the OXCs at the optical layer would not generally be considered or used. Thus, routing at the optical layer would not advantageously be seen as an option for recovery of this IP-layer failure. The recovery would then be limited to the switching at the IP layer of the two streams, e.g., into alternative dummy outbound IP port (212) at router R3 that was reserved for IP-layer restoration into an alternative optical port on OXC3, and carriage of the two streams using capacity reserved (by the IP-layer mechanisms) on links 3-4, 4-5, 5-6, and 6-1. This approach is illustrated by dotted lines 202 and 204 that correspond to pure IP-layer restoration paths for the first and second streams, respectively. Specifically, as illustrated, the pure IP-layer restoration paths for the first and second streams are:

R3→OXC3→OXC4→OXC5→R5→OXC5→OXC6→OXC1→R1 and

R3→OXC3→OXC4→OXC5→R5, respectively.

To employ these restoration paths, IP router R3 would need to have reserved an additional port (212) that had full λ capacity available and was nailed up (from the IP-layer perspective) to enable carrying the streams through OXC3, through OXC4, and through OXC5 to IP router R5, where the streams would then be routed at the IP layer by IP router R5. IP router R5 would terminate the second stream. It would also route the first ½λ bandwidth stream onto a single wavelength that was routed out a port of IP router R5 via fiber to OXC6 and from there glassed through to OXC1→R1. The choice of the outbound IP port at R5 would consider how the corresponding optical input port on OXC5 was switched to an output port of node 5. In other words, the aggregation would have to be to a wavelength that was ultimately passed through OXC5, through OXC6, to OXC1 and through OXC1 to one of the input IP ports of router R1 where the first stream is to be terminated. Equivalently, these paths would need to have been reserved in the prior art approach and the associated cost of the reservation borne by the mechanism. In this example, the network components, capacity, and ports involved in these rerouted-IP paths are exclusively for restoration purposes. Therefore, the total incremental cost (see FIG. 2) of the pure IP restoration scheme is four additional IP ports (outbound port 212 at source router R3, inbound port 224 and outbound port 226 at transit router R5, and inbound port 228 at destination router R1), and additional wavelengths on links 3-4, 4-5, 5-6, and 6-1.

Joint IP-optical Restoration

Figure 2:
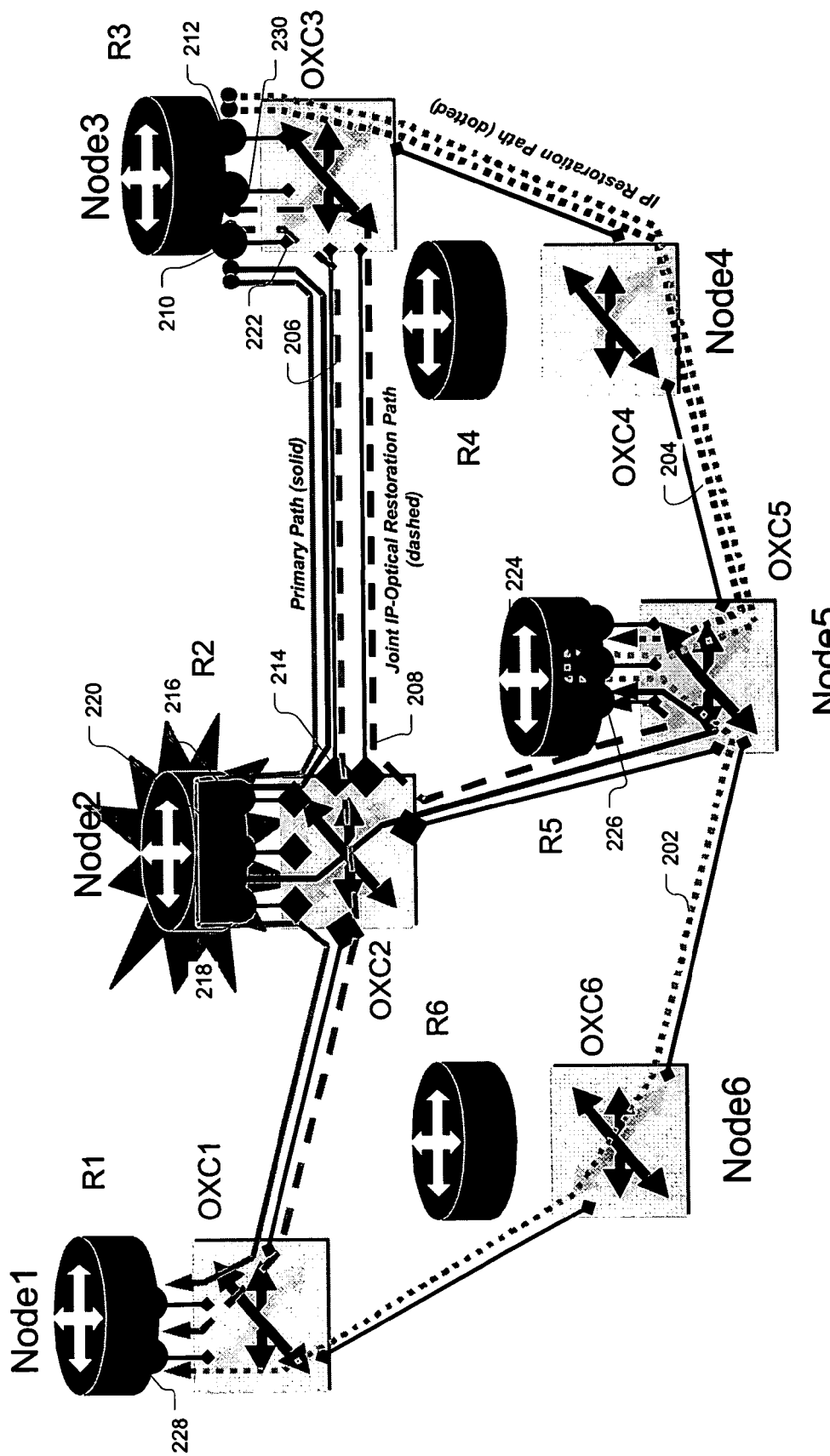
FIG. 2 illustrates an IP-over-optical network with a single router failure.

According to an embodiment of the present invention, however, a joint packet-optical layer mechanism can control routing at the IP layer while also taking advantage of switching capability at the optical layer. This scheme generally is more economical of resources (e.g., expensive IP ports) and, given the same two-stream scenario above and the same IP router R2 failure, it results in the joint-layer restoration paths indicated by dashed lines 206 and 208. Note that, because the OXC co-located with the failed router provides a dynamic switching functionality at the wavelength layer, it reroutes the affected traffic around failed router R2. In this case, the rerouted traffic physically follows the same paths as the primary traffic paths except that the failed router is bypassed. However, since the optical layer can only switch wavelengths (and not packet streams), the two IP packet streams can no longer be bundled together at source router R3 and share a common wavelength. Therefore, the source router R3 routes each IP packet stream to its own outbound IP port (and thus involves additional outbound IP port 230). The two wavelengths corresponding to the two streams are then combined at the optical layer into a single fiber (or carried on two separate fibers) between nodes 3 and 2. At the other end of link 3-2, the wavelengths connect to smart optical ports at OXC2, where each IP packet stream can be switched to its own outbound smart optical port, thereby leading each IP packet stream to the next link along the routed path without the involvement of router R2. Therefore, as FIG. 2 shows, the first IP packet stream follows the alternative path

R3→OXC3→OXC2→OXC1→R1 and reuses the original service ports and wavelengths. The second IP packet stream follows the alternative path

R3→OXC3→OXC2→OXC5→R5.

This restoration scheme thus uses an additional IP router port at R3 and an additional wavelength on link 3-2 but it reuses the wavelength on link 2-5. Therefore, with the help of actions at OXC2, the failed IP router R2 is bypassed by the two affected IP traffic streams at the expense of adding one additional IP port at the source router R3, seven additional smart optical ports at the various OXCs, and one additional wavelength on link 3-2. Note that, in this specific example, all the additional smart optical ports happened to be added on OXC2, however, in general, they can be distributed to one or more of the nodes as applicable. Since smart optical ports are significantly less expensive than IP router ports, the joint IP-optical restoration scheme is cost effective in this example compared to a pure IP restoration scheme.

As this example illustrates, the joint-layer router restoration mechanism can be more cost effective than a pure IP-layer restoration scheme. However, considerations were restricted to only higher-layer node (router) protection and failures in a packet-over-optical network.

Resource Sharing of Joint-Layer Router Protection and Optical Link Protection

In this section, the efficacy of the proposed joint-layer mechanism for higher-layer node protection in the presence of existing link protection is discussed. Here, it is assumed that link protection is provided by the optical transport layer.

One advantage that the joint-layer restoration mechanism enjoys over single-layer mechanisms is that all network resources in the orchestrated layers are visible to the joint-layer mechanism and available for use. In particular, when the optical layer reserves spare capacity for link restoration, the joint IP-optical layer restoration for IP-router failures can take advantage of existing spare transport facilities provisioned for the link failure recovery scheme. By contrast, the IP layer itself is generally unaware of any transport-layer protection capacity, thereby suggesting that pure IP-layer router protection is generally significantly less cost-effective than a joint IP-optical scheme. Thus, overlaying joint IP-optical router protection on transport-layer link protection can permit strong synergy of protection capacity reuse. Indeed, the proposed joint IP-optical router protection introduces little or no incremental cost when it is overlaid on existing transport-layer link protection.

Figure 3:
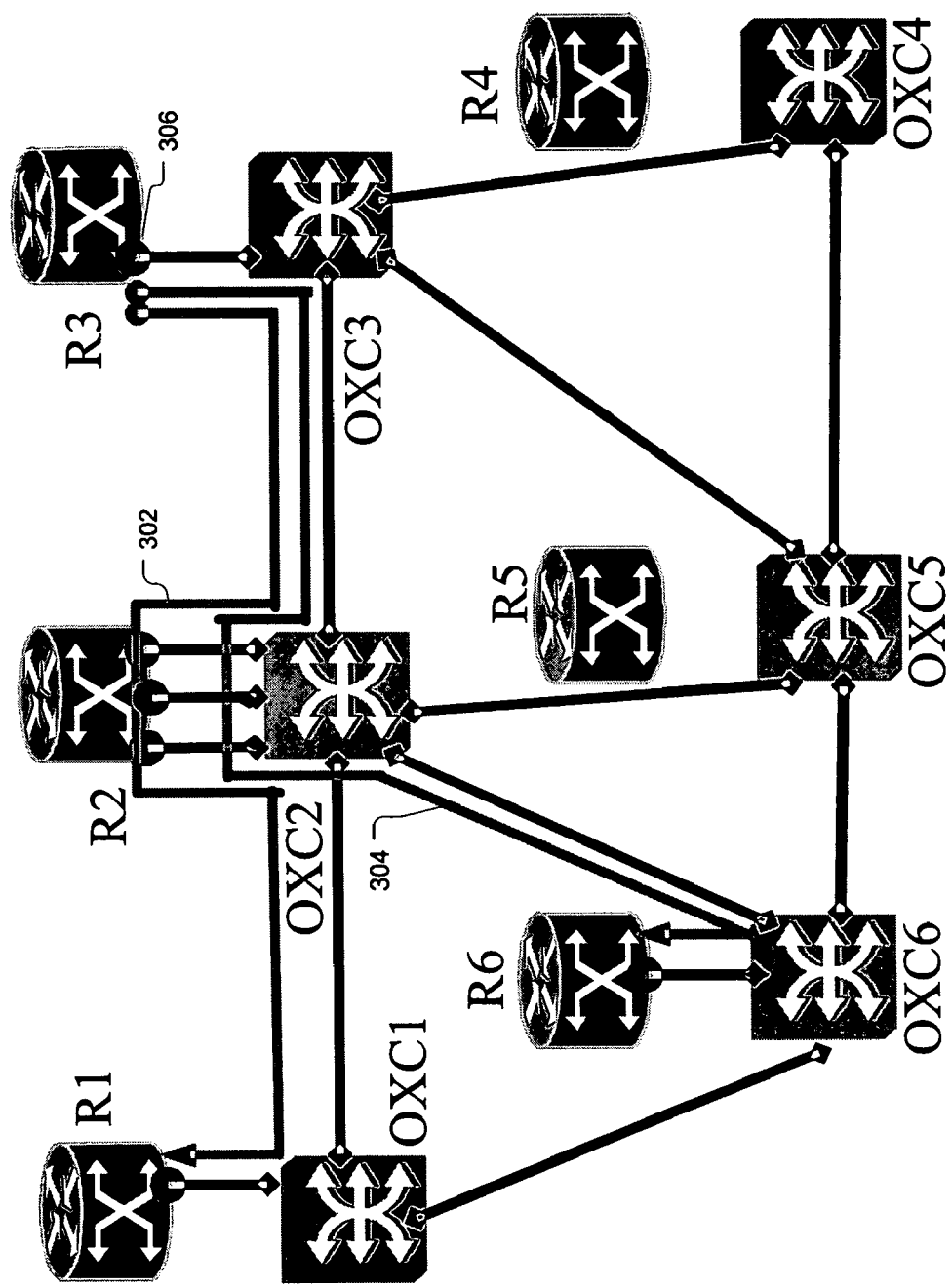
FIG. 3 illustrates the primary paths for two IP packet streams in an IP-over-optical network.

FIGS. 3, 4, 5, and 6 further illustrate the joint packet-optical restoration scheme of the present invention via a number of examples. FIG. 3 illustrates a six-node IP-over-optical network carrying two IP streams. Both IP packet streams are multiplexed together into a single wavelength at router R3 and then output via outbound IP port 306 from router R3 to OXC3. The first stream 302 between R3 and R1 follows primary path R3→OXC3→OXC2→R2→OXC2→OXC1→R1. The second stream 304 between R3 and R6 follows primary path R3→OXC3→OXC2→R2→OXC2→OXC6→R6. Note that the two streams are groomed together at R3 into a single wavelength and then glassed through OXC3 to OXC2 where they are demultiplexed and routed to separate wavelengths by router R2.

Pure Optical-Layer Link Protection

Figure 4:
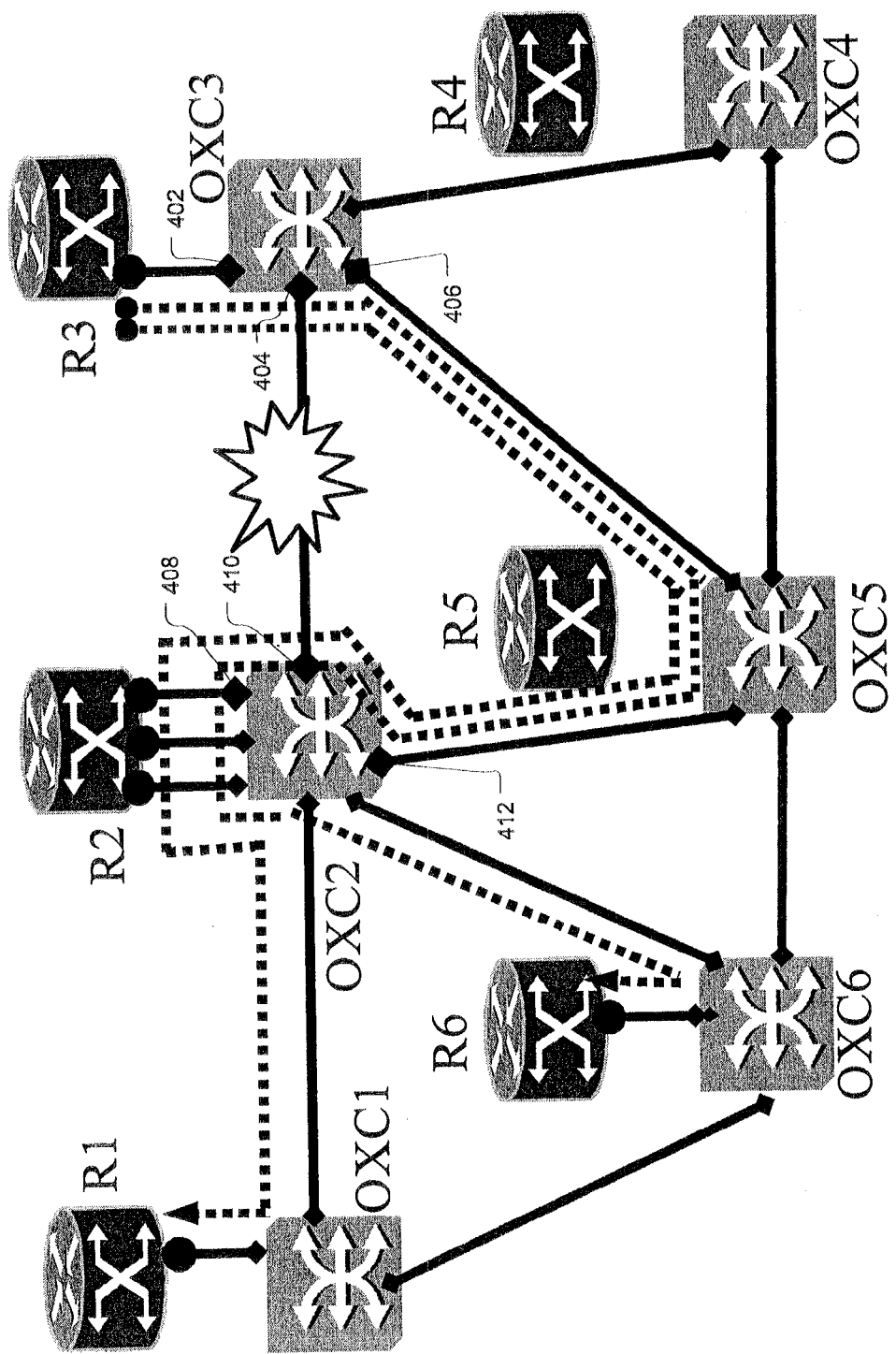
FIG. 4 illustrates the use of smart optical ports in the recovery from a link failure in the IP-over-optical network of FIG. 3.

FIG. 4 illustrates a scenario of a single failure of link 3-2 and recovery by pure optical-layer mechanisms of the prior art. In detail, the link failure is locally recovered at the optical layer by routing around the failed link 3-2 using alternate path OXC3→OXC5→OXC2. This is accomplished using three smart ports at each of OXC3 and OXC2. Specifically, the primary and restoration paths of this scenario are enabled by smart optical ports 402, 404, and 406 on OXC3 and smart optical ports 408, 410, and 412 on OXC2. Note that, since the optical layer cannot distinguish nor switch traffic flows at a finer granularity than a wavelength, these two packet streams are glassed-through at OXC5 to OXC2 where they are then passed to R2 for demultiplexing and passed back to OXC2 on separate wavelengths for optical-layer switching: one stream to OXC1→R1 and the other stream to OXC6→R6. Note that the routing operation of router R2 is not affected by the failure. In other words, nothing changes at the IP layer in terms of routing to recover from the link failure. However, as will be seen, this is sub-optimal to a solution of the present invention, which makes use of both the optical-layer restoration capacity as well as the IP-layer routing functionality and reserved capacity to minimize the cost of the network.

Joint-Layer Restoration Overlaid on Optical-Link Protection

Figure 5:
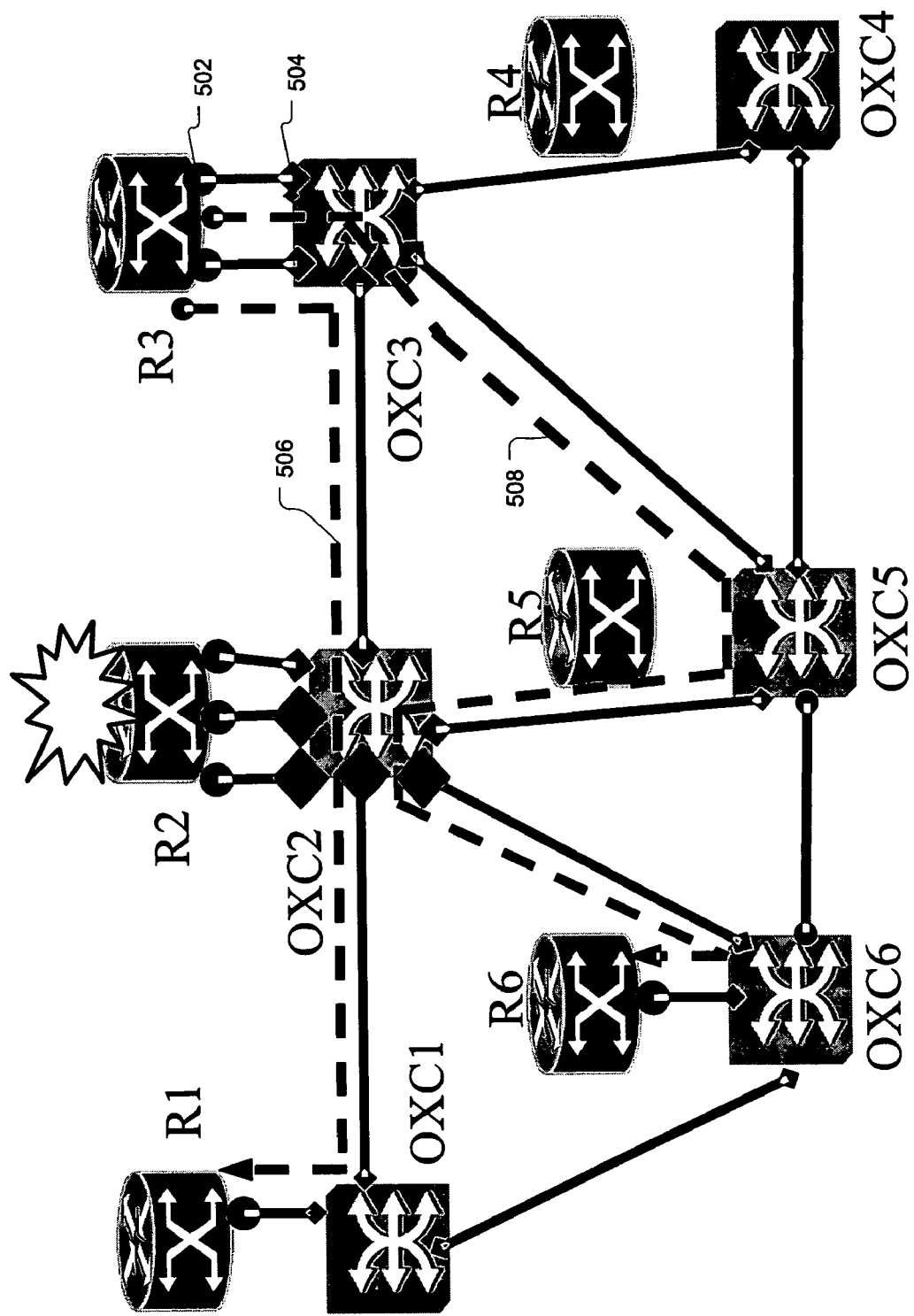
FIG. 5 illustrates joint-layer router protection overlaid on existing link protection in the IP-over-optical network of FIG. 3.
Figure 6:
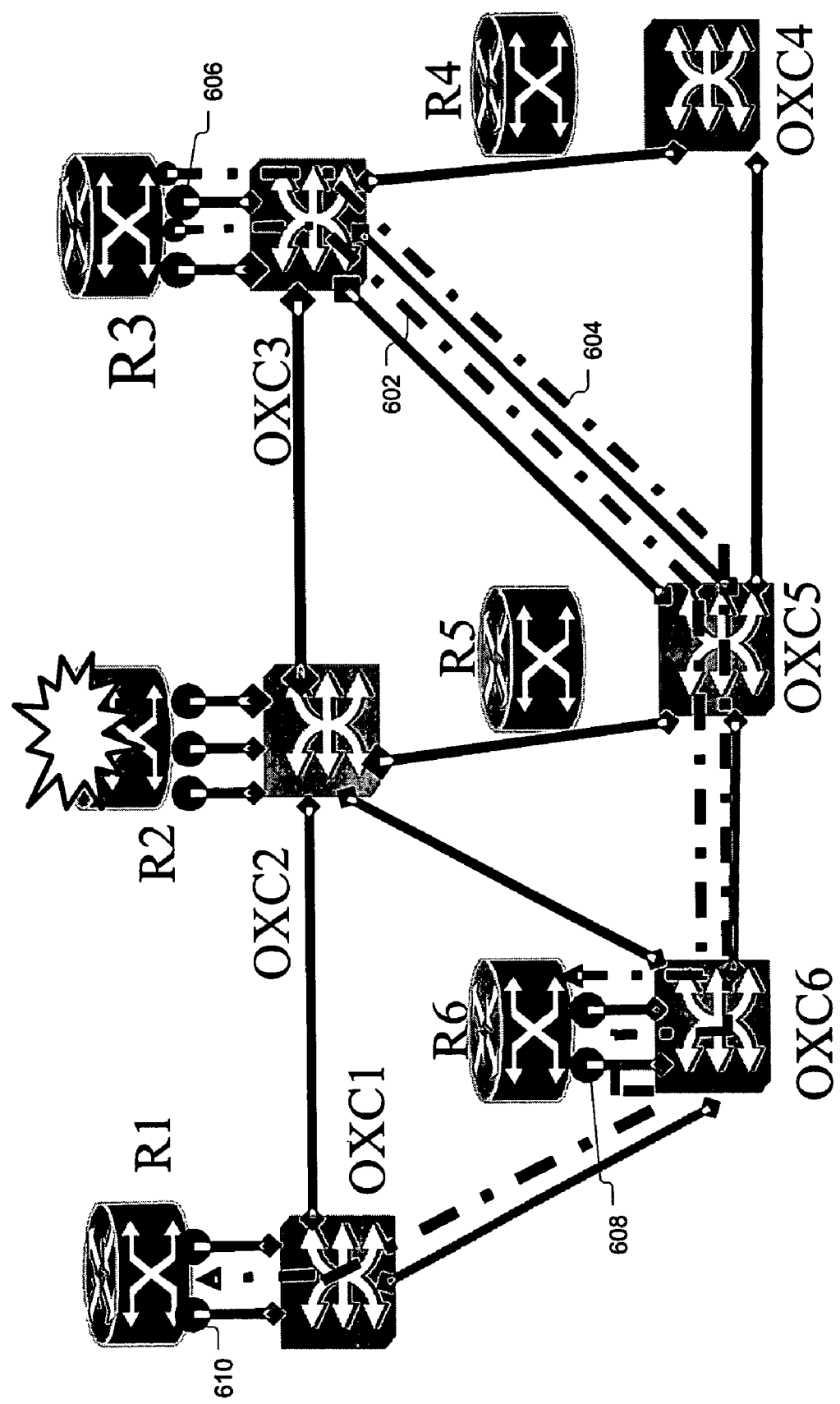
FIG. 6 illustrates pure IP-layer router protection overlaid on existing link protection in the IP-over-optical network of FIG. 3.

FIG. 5 illustrates the benefits of a joint-layer recovery scheme of the present invention when overlaid on existing optical-layer link protection. Taking advantage of the restoration bandwidth that was demonstrated in the prior example to exist at the optical layer, as well as the smart optical ports that were needed to provide for link restoration at the optical layer, the present invention can handle the failure of router R2 with a reduced network cost. By adding additional IP port 502 to router R3 and corresponding additional smart optical port 504 to OXC3, R3 can be used to feed the two streams via different wavelengths to OXC3. This provides OXC3 with additional flexibility in the optical routing of the two streams. By routing packet stream 506 straight through OXC2 to OXC1→R1 and glassing packet stream 508 through OXC5 and OXC2 at the optical layer to OXC6→R6, there is only one additional IP port. Note that a total of five additional smart optical ports are also used in this solution (smart optical port 504 and four additional smart optical ports at OXC2), but each smart optical port is of significantly less cost than an IP port, and the overall solution is very economical.

Pure IP-Layer Router Protection Overlaid on Optical Link Protection

By contrast with the example of FIG. 5, a pure IP-layer protection scheme results in a higher network cost because it is unable to take advantage of the existing spare resources from the transport-layer link protection. Consider the network of FIG. 6, which utilizes pure IP-layer restoration in the presence of optical transport-layer link protection. When router R2 fails and the affected packet streams (of FIG. 3) are to be recovered by a pure IP protection scheme, the restored packet streams follow alternative paths 602 and 604 (dotted lines) shown in FIG. 6. So, three additional IP ports and three additional wavelength channels are added in the network (the added components are IP ports 606, 608 and 610 and optical channels on links 3-5, 5-6 and 6-1 in FIG. 6) compared to only one IP port and five smart optical ports added for the same router failure scenario recovered using a joint IP-optical layer restoration mechanism of the present invention, as shown in FIG. 5.

In the example of FIG. 5, only two IP packet streams and the protection capacity for a specific single-link failure scenario were considered. When all possible single-link failure scenarios are considered, it is expected that there will be substantially more protection resources (e.g., optical channels and optical ports) in the transport layer that are actually reserved. These additional resources give rise to additional reuse opportunities for the joint packet-optical restoration mechanism.

Implementations

The basic operations that are needed to implement the joint packet-optical restoration mechanism include reconfiguring connections in the OXCs as well as rearranging traffic flows at the IP layer. The particular actions to be taken depend on the failed router.

One exemplary implementation of the proposed joint IP-optical router restoration mechanism involves precomputing the alternative IP routes and the cross-connect maps for optical re-routing at a centralized network management system (NMS). These computations are performed for each different router-failure scenario and downloaded to the appropriate network elements. When there is a router failure, the router network elements detect the failed router in a distributed fashion. This failure information can then be conveyed to the optical layer via, for example, a GMPLS/MPLS-over-UNI (User Network Interface) type mechanism, which can be deployed using either an overlay model or a peer-to-peer model approach. Such methods are described in more detail in Eric Mannie, et al., "Generalized Multi-Protocol Label Switching (GMPLS) Architecture," IETF, draft-ietf-ccamp-gmpls-architecture-01.txt, November 2001, work in progress, User Network Interface (UNI) 1.0 Signaling Specif., OIF Forum, www.oiforum.com, October 2001, and Ayan Banerjee, et al, "Generalized Multiprotocol Label Switching: An Overview of Routing and Management Enhancements," IEEE Communications Magazine, Vol. 39, No. 1, January 2001, each incorporated herein by reference in its entirety. Once all the IP- and optical-layer network elements are aware of the failed router, each of them implements the precomputed actions independently. Although this combination of centralized computation and distributed activation is likely to achieve the best combination of cost efficiency and restoration speed, other implementations are within the scope and intent of the present invention including localized, centralized, distributed, and hierarchical architectures for detection and joint-layer restoration.

Analysis

The examples considered indicate that a joint IP-optical layer restoration scheme can be a cost-effective approach to providing protection against failures in packet-over-optical networks. Applying these concepts to the real world involves capturing the restoration trade-offs in a network protection design problem and then solving this problem for various cases. Model formulations are discussed below.

IP-over-Optical Network Protection Design Problem Statement

Performing restoration purely in the IP layer can lead to more efficient utilization of transport capacity since subrate packet streams can be groomed together, something that is not practical to do in the optical layer. A subrate packet stream does not fully occupy the capacity of an optical channel. Further in a pure IP-layer restoration scheme, there is no need for dynamic reconfigurability at the optical layer and its attendant costs (e.g., smart optical ports). A joint-layer restoration scheme, on the other hand, can (1) implement dynamically reconfigurable connections for optical-layer restoration rerouting without use of expensive IP ports and (2) utilize pre-existing transport-network resources, including any spare optical transport channels or reconfigurable connections in the network already in place for other failure protection, as well as the primary network capacity. One goal of joint-layer restoration is to cost-effectively provide protection against router failures for a packet-over-optical network by determining what combination of IP-layer subrate grooming and optical-resource reuse is cost-effective for protection of failures in the packet layer.

One way to state this goal is as follows: Given a network with IP routers at every node, their inter-connectivity (links), the primary paths for the end-to-end IP packet streams, optical-channel capacity, and element costs, find which protection mechanism to use for each stream in each IP router failure scenario such that total protection costs is minimized. The costing includes the cost of each IP port, the cost of each smart optical port, the and cost per unit distance for an optical channel. The total protection costs are determined as a function of protection design variables, which include:

Restoration mode of each packet stream (e.g., IP or joint),
Traffic flow of each packet stream restored at the IP layer,
Number of optical channels on each link, and
Number and type of ports (e.g., IP and smart optical) at each node.

Smart optical ports are optional at each node, depending on restoration needs. Also, any pre-existing smart ports or optical-channel capacity provided for link-failure protection by the optical layer should be re-usable.

Exemplary Modeling Approach

In one embodiment of the present invention, the problem described above can be formulated as a mixed-integer optimization problem (see, for example, G. Nemhauser and L. Wolsey, Integer and Combinatorial Optimization, John Wiley & Sons, New York, 1988) with a goal of minimization of the total protection cost (e.g., IP ports, smart optical ports, and optical channels) for any single router failure in the network. The optimization problem can be formulated as a modified form of a fixed-charge multi-commodity flow problem with discrete link and node capacities and costs. The model constraints impose the IP and joint restoration rerouting conditions for each stream as well as link capacity and port counting rules to perform discrete costing of optical channels and ports.

Modeling each packet stream as a network flow with flow-balance constraints at each node captures the full rerouting flexibility of the IP restoration mechanism. This allows IP traffic to be split up for rerouting around a failed IP router and at the same time identifies grooming opportunities that can reduce optical-channel costs, including using underutilized primary-path facilities. To save on IP port costs, the IP logical topology and physical network topology do not have to coincide. This means that the sub-channel part of any packet stream does not have to be groomed at each node in the IP layer, thus reducing IP port needs. To further save IP port costs, it is assumed that full optical-channel demands are routed directly (via express logical links) at the optical layer between terminal nodes, thus avoiding unnecessary grooming at intervening IP ports. A consequence of this is that, when a router fails, the full-channel part of an IP packet stream is unaffected since it would be expressed through at the underlying optical layer of the failed IP router; otherwise, the entire packet stream traffic is lost if it is terminated at the failed router. Therefore, the restoration opportunity in any router failure scenario in a "single-homing" node model corresponds to the subrate part of all streams that are not terminated at the failed router. A single-homing node includes just one router per OXC. Note that, in a multi-homing node model with redundant routers homed to each OXC, the restoration opportunity is the entire packet stream (see, for example, Chiu 2001 and G. Atkinson, et al., "Coordinated Joint Layer Protection in Packet-over-Optical Networks", forthcoming).

For the joint-restoration mechanism, cost savings come mainly from reuse of optical resources already allocated for the primary paths for packet streams or transport-layer protection. When a router fails, the joint mechanism restores subrate packet streams that transition the failed router by using the streams' original optical channels combined with the dynamic reconfigurability of the optical connections underlying the failed router. However, a joint-layer restoration scheme also generally addresses subrate streams multiplexed together on an optical channel that would have otherwise been demultiplexed at the failed router and routed onto distinct optical channels to different destinations. Given that such grooming is typically performed at the IP layer, there are several ways this can be implemented in a network (e.g., see C. Chigan, et al., "Demuxing Models in Joint Multilayer Restoration for Packet-over-Optical Networks," 37th Annual Conference on Information Sciences and Systems, Johns Hopkins Univ., Maryland, March, 2003). One approach is to perform de-multiplexing at the IP layer at a router upstream from the failed router by grooming together at the upstream router into separate optical channels all subrate packet streams with common ingress and egress IP ports on the failed router (see FIGS. 2 and 5). This may use additional IP ports and optical channels on the ingress side of the failed router. Another approach is to optically cross-connect all packet streams transiting the failed router through to the next router and let that downstream router groom them and route them onward to their destinations. The former approach is generally more efficient since traffic can be more cost-effectively redirected to its final destination.

Exemplary Mathematical Programming Problem Formulation

In this section, a mathematical formulation of a mixed-integer programming problem is presented. The solution to this problem minimizes the total cost of the IP-over-optical network to protect packet streams against any single IP router failure. In the following, the term "demand" is used synonymously with the term "packet stream" that has been used in earlier discussions.

Model Assumptions

When a router failure occurs, the affected demand can be either (1) switched by the optical layer at that node and stay along the primary path, or (2) be rerouted at the IP layer, or (3) jointly perform a mixture of both (1) and (2). Therefore, for each router failure scenario, joint restoration may be performed for some demands and pure IP restoration for others.

The total costs of both the primary paths and the backup paths for all the network components are included in the objective function that is to be minimized. The reason for this is that the model allows the restoration scheme to utilize any residual capacity in the primary network capacity and thus captures any cost efficiencies in IP restoration through utilization of latent primary capacity.

All links and demands in the network are bi-directional, so each graph edge is replaced by two oppositely directed arcs and each demand is replaced by two oppositely directed uni-directional demands.

The capacity of each arc is measured in discrete units (wavelengths or optical channel capacity). The bandwidth requirement of each demand can be greater or less than one optical channel.

There are two IP ports per node for demand bundles that pass through a node and one IP port per node for demand bundles that terminate at a node. For optical restoration at a node when its IP router fails, two smart optical ports are used for demand bundles that pass through a node.

Model Invariants

| | |
|---|---|
| N | set of network nodes (sites). |
| A | set of network unidirectional arcs. |
| $A_n$ | set of arcs incident on node n ($= I_n \cup O_n$). |
| $I_n$ | set of incoming arcs incident on node n. |
| $O_n$ | set of outgoing arcs incident on node n. |
| D | set of IP-layer traffic demands. |
| $\tau_d$ | capacity requirement for demand d∈D. |

Model Invariants -continued

| | |
|---|---|
| $s_d$ | source node of demand d. |
| $t_d$ | destination node of demand d. |
| $P_d$ | primary (node) path for demand d. $\equiv \{s_d = n_0, n_1, n_2, \ldots, n_k = t_d\}$. |
| D(a) | set of demands with a∈A in the primary path $\equiv \{d \in D \mid a \in A \ \& \ a = (n_k, n_{k+1}) \subseteq P_d\}$. |
| $D_n$ | set of demands that are affected by a failure at node n, which can be recovered $\equiv \{d \in D \mid n \in P_d \setminus \{s_d, t_d\}\}$. |
| $D_n(a, a')$ | set of demands affected by node n failure with a∈$I_n$ and a'∈$O_n$ in the primary path $\equiv \{d \in D_n \mid a = (n_k, n_{k+1} = n) \subseteq P_d \ \& \ a' = (n = n_{k+1}, n_{k+2}) \subseteq P_d\}$. |
| $\lambda$ | bandwidth capacity of an optical channel and IP port. |
| $C^{IP}$ | IP-layer port unit cost. |
| $C^{OP}$ | Optical-layer smart port unit cost. |
| $C_a$ | Cost per optical channel for arc a. |
| $\epsilon$ | Small scalar cost to eliminate source-less cycles. |

Decision Variables

| | |
|---|---|
| $x^{nd}$ | =1, if demand d∈$D_n$ goes through the optical layer at node n when the IP router there fails; 0, otherwise. |
| $y^{nd}_a$ | ∈ [0, $\tau_d$], is the amount of demand d∈$D_n$ traffic on alt. IP path arc a∈A\$A_n$ when the IP router at node n fails. |
| $z_a$ | number of optical channels (capacity) needed for arc a, which is bidirectional. |
| $p_a$ | number of optical channels on arc a for primary traffic and IP restoration. |
| $i_a$ | number of IP ports/optical channels needed on incoming arc a for primary traffic and restoration. |
| $o_a$ | number of IP ports/OChs needed on outgoing arc a for primary traffic and restoration. |
| $w^n_{a,a'}$ | number of optical channels needed for demands optically restored upon IP router failure at node n that transit node n from arc a to arc a'. |
| $u_n$ | number of IP-layer ports needed at node n. |
| $v_n$ | number of smart optical ports needed at node n for restoration when the router there fails. |
| $r_n$ | number of smart ports needed at n for router interface. |
| $q_n$ | =1, if optical restoration occurs at node n; =0, otherwise. |

Mixed-Integer Program Formulation for Joint IP-Optical Layer Protection Design

The joint-layer protection design problem is formulated as follows:

Minimize:

$$\Sigma_{a \in A} C_a z_a + C^{IP} \Sigma_{n \in N} u_n + C^{OP} \Sigma_{n \in N} v_n + \epsilon \Sigma_{n \in N, d \in D_n, a \in A \setminus A_n} y^{nd}_a$$

Subject to re-routing of demand d when IP restoration is applied to it:

$$\Sigma_{(k,j) \in A \setminus I_n} y^{nd}_{(k,j)} - \Sigma_{(j,k) \in A \setminus O_n} y^{nd}_{(j,k)} = \tau_d (1-x^{nd})(\delta_{k,s_d} - \delta_{k,t_d}), \ \forall n \in N, \ d \in D_n, \ k \in N \setminus \{n\} \quad (1)$$

The number of optical channels required for affected demands restored optically transiting node n from arc a to arc a':

$$\lambda w^n_{a,a'} \geq \Sigma_{d \in D_n(a,a')} x^{nd} \tau_d, \ \forall n \in N, \ a \in I_n, \ a' \in O_n \quad (2)$$

The number of optical channels required on arc a for primary capacity:

$$\lambda p_a \geq \Sigma_{d \in D(a)} \tau_d, \ \forall a \in A \quad (3)$$

The number of optical channels required on arc a when it is used for IP restoration and unaffected primary traffic:

$$\lambda p_a \geq \Sigma_{d \in D(a) \setminus D_n} \tau_d + \Sigma_{d \in D_n} y^{nd}_a, \forall n \in N, a \in A \setminus A_n \quad (4)$$

The number of optical channels required on incoming/outgoing arc a to failed node n for optical restoration:

$$i_a \geq \Sigma_{a' \in O_n} w^n_{a,a'}, \forall n \in N, a \in I_n \quad (5a)$$

$$o_a \geq \Sigma_{a' \in I_n} w^n_{a',a}, \forall n \in N, a \in O_n \quad (5b)$$

The number of IP ports/optical channels required on incoming/outgoing arc a for primary traffic and IP restoration:

$$i_a \geq p_a, \forall a \in A \quad (6a)$$

$$o_a \geq p_a, \forall a \in A \quad (6b)$$

The number of optical channels required on arc a for primary traffic, IP and incoming/outgoing optical restoration:

$$z_a \geq i_a, \forall a \in A \quad (7a)$$

$$z_a \geq o_a, \forall a \in A \quad (7b)$$

The number of IP ports required at node n:

$$u_n = \Sigma_{a \in I_n} o_a + \Sigma_{a \in O_n} i_a, \forall n \in N \quad (8)$$

Determine whether any optical restoration occurs at node n:

$$q_n \geq x^{nd}, \forall n \in N, d \in D_n \quad (9)$$

The number of optical ports required at node n for the router (IP port) interface:

$$r_n \geq u_n - (1 - q_n)|A||D|, \forall n \in N \quad (10)$$

The number of optical ports required at node n:

$$v_n = 2\Sigma_{a \in I_n} \Sigma_{a' \in O_n} w^n_{a,a'} + r_n, \forall n \in N \quad (11)$$

The domains of definition of the variables are as follows:
$x^{nd} \in \{0,1\}, \forall n \in N, d \in D_n$
$y^{nd}_a \in [0, \tau_d], \forall n \in N, d \in D_n, a \in A \setminus A_n$
$z_a, p_a, i_a, o_a \in Z_+, \forall a \in A$
$w^n_{a,a'} \in Z_+, \forall n \in N, a \in I_n, a' \in O_n$ (NB: $w^j_{(i,j),(j,i)} = 0, \forall i, j \in N$)
$q_n \in \{0,1\}, \forall n \in N$
$u_n, v_n, r_n \geq 0, \forall n \in N$ The objective function of the optimization has four terms. The first three are the total costs of, respectively, the transmission wavelengths, the IP ports, and the optical switch (smart) ports. The last term is present to eliminate source-less cycles in the network flow problem solutions, where the scalar $\epsilon$ is assigned a small number.

When the IP router at node n fails, constraint set (1) above defines the network flow balance constraints for each demand $d \in D_n$ that is to be restored by the IP layer ($x^{nd} = 0$). Otherwise, $x^{nd} = 1$ and demand d (i) will be restored by the optical layer when the IP router at node n fails and (ii) will physically follow the primary path at the optical layer. Constraint set (2) above counts the number of required optical channels for optical restoration at node n based on all optically restored demands ($x^{nd} = 1$) co-transiting through the OXC at n from ingress arc a to egress a'. Note that since variables $w^n_{a,a'}$ are defined as integer, an entire optical channel must be assigned on that arc even if the total capacity need is a fractional optical channel $\lambda$, since the optical layer cannot distinguish any finer granularity.

Constraint set (3) enforces the condition that the number of optical channels required on arc a must be at least that required for primary traffic transiting it.

Constraint set (4) states that the total number of optical channels required on arc a must also be at least the number needed for both the IP restoration capacity for affected traffic and the primary path capacity for unaffected traffic. Together with Constraint Set (3), these constraints ensure that sufficient optical channels are provisioned on each arc for primary and IP restoration traffic.

Constraint sets (5) and (6) combine to ensure that the appropriate number of optical channels and IP ports are provisioned on arc a. This includes not only optical channels and IP ports for primary traffic and IP restoration, but also additional such resources needed for joint-layer restoration. In joint-layer restoration, the primary path capacity of the affected traffic is automatically reused. However, additional capacity could possibly be needed when the affected traffic demands are demultiplexed by the upstream IP router. Subrate traffic will still request the whole optical channel on the links along the optically "restored" path. However, traffic demands co-transiting from the same ingress arc and to the same egress arc as described by constraint set (2) are bundled together. Only the traffic demands to different egress arcs are distinguished by the upstream IP router and therefore require IP ports and wavelengths at the optical layer for each separate traffic-demand bundle. Constraint sets (5) and (6) together imply that, for a specific router failure, affected traffic will be recovered exclusively by either (i) joint-layer restoration of reusing the primary path or (ii) taking the IP restoration with the request of the additional capacity provisioning. Thus, the overall incoming/outgoing capacity for a specific arc a takes the maximum of constraint set (5) and constraint set (6).

Constraint set (7) provisions the total number of wavelengths needed on each arc in the network. Since the arcs are bidirectional, this number should be greater than the number of wavelengths required by both the incoming arc and the outgoing arc.

Constraint set (8) determines the total IP ports needed by each router.

Constraint sets (9) and (10) together count the number of smart optical ports required at each node for the router interface. Finally, constraint set (11) calculates the total number of smart optical ports needed on the OXC at each network node.

Mixed-Integer Program Formulation for Pure IP-Layer Protection Design

The difference between the mixed-integer program formulations of the joint-layer restoration scheme and the pure IP restoration scheme is that, the model for the joint-layer scheme introduces extra variables to deal with the trade-off among the smart optical ports, the IP router ports, and the transmission resources. When variables $x^{nd}$ are forced to zero, the two models are equivalent. That is, the traditional pure IP-layer restoration is a special case of joint IP-optical layer restoration. Indeed, in the case that pure IP-layer restoration turns out to be the optimal scheme, these two models will obtain the same solutions.

Concluding Remarks

The present invention can be implemented as a joint-layer (i.e., multilayer) restoration scheme that draws upon coordinated actions across (at least) two network layers to synergistically provide network protection. These coordinated actions can be exercised at a single node or distributed to two or more nodes. For example, the invention may involve recovering from a failure by modifying operations of one node at two different network layers or it may involve modifying operations of one node at a first network layer and modifying operations of another node at a second network layer. The present invention may also involve modifying operations of nodes at more than two different layers. When it is used in a packet-over-optical network to provide protection against single packet switch (e.g., router) failures, it can be cost-effective compared to a pure packet-layer restoration scheme. In particular, when joint IP-optical router protection overlays transport-layer link protection, it permits strong synergy of protection capacity reuse that allows low- or no-cost router protection to be achieved.

Cost savings are based on the assumption that, in a single router failure scenario, any demands terminated at a failed router would be lost and that at least a portion of the restoration opportunity is the subrate traffic that transits a failed router. However, multi-homing allows all demands to be considered for restoration and can increase the protection cost savings realizable from a joint-layer protection scheme.

An exemplary modeling approach is presented for the proposed joint-layer router failure restoration scheme, where the primary routes are considered as a given. As would be understood to one skilled in the art, alternative modeling approaches could also be used. Case studies show significant cost savings of this joint-layer restoration approach compared to a pure IP-layer restoration mechanism. It is generally understood, however, that the integrated restoration scheme, where the primary paths and the backup paths are provisioned simultaneously, is more cost-effective than the non-integrated approach. Where cost-saving comparison of integrated joint-layer restoration and integrated pure-IP restoration for router failure protection are considered, mechanisms are set up whereby primary and secondary paths are found simultaneously by the model in any failure scenario. In this case, the combinatorial models are solved with sufficient fidelity to provide discriminating results.

While the embodiments of this invention have been discussed with respect to implementations that pre-compute pathways, they may equally well be applied to implementations where some or all of the computation or optimization of alternative routes is computed after the failure is detected and, in some cases, may involve fault isolation in the alternative route determination.

While this invention has been described with respect to restoration associated with situations involving single-point failures, the concepts, and in particular, the link-state description, can be extended to multiple-point failure situations, as would be understood to one skilled in the art.

While the present invention has been described in the context of router failures, the concepts of joint-layer restoration in packet-over-optical networks may be extended to cover other failures, such as failures of optical cross-connects, optical ports, fibers, cables, links, packet ports, misconfigurations, connectors, power-related failures, and transceivers.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for restoring service after a failure in a multi-layer network capable of operating at two or more different network layers, the network comprising a plurality of nodes, at least one node capable of operating at more than one network layer, the method comprising the steps of:
    detecting the failure; and
    modifying the operations of one or more of the nodes at two or more different network layers to restore at least some portion of the service affected by the failure by routing around the failure, wherein:
        the multi-layer network is a packet-over-optical network having a packet layer and an optical layer;
        one or more nodes operate at both the packet and optical layers;
        each node operating at both the packet and optical layers comprises an optical cross-connect (OXC) and a packet router;
        the step of modifying the node operations comprises the steps of:
            modifying optical-layer processing of at least one of the OXCs; and
            modifying packet-layer processing of at least one of the packet routers;
        prior to the failure, first and second packet streams are transmitted within a single optical channel to a transit packet router that demultiplexes the single optical channel for further transmission of each packet stream within a different optical channel; and
        when the failure is a failure of the transit packet router, the step of modifying the node operations comprises the steps of:
            modifying the packet-layer processing of an other packet router to cause that other packet router to generate two different optical channels for the first and second packet streams; and
            modifying the optical-layer processing of one or more OXCs to route the two different optical channels.

2. The invention of claim 1, wherein the one or more OXCs comprises an OXC that is part of the node having the failed transit packet router.

3. The invention of claim 1, wherein the step of modifying the operations of one or more of the nodes comprises the step of modifying node operations to use network resources already reserved for pure single-layer service restoration.

4. The invention of claim 3, wherein the pure single-layer failure recovery is pure optical-layer service restoration.

5. The invention of claim 4, wherein the modifying is a function of a solution to a mixed-integer optimization problem.

6. The invention of claim 5, wherein the optimization problem includes at least one of the variables: number of IP ports, number of smart optical ports, and number of optical channels.

7. A multi-layer network capable of operating a two or more different network layers, the network comprising a plurality of nodes, at least one node capable of operating at more than one network layer, wherein the network is adapted to:
    detect a failure; and
    modify the operations of one or more of the nodes at two or more different network layers to restore at least some portion of the service affected by the failure by routing around the failure, wherein:
        the multi-layer network is a packet-over-optical network having a packet layer and an optical layer;
        one or more nodes are adapted to operate at both the packet and optical layers, each node adapted to operate at both the packet and optical layers comprises an optical cross-connect (OXC) and a packet router;

the node operations are modified by modifying optical-layer processing of at least one of the OXCs and modifying packet-layer processing of at least one of the packet routers;

prior to the failure, first and second packet streams are transmitted within a single optical channel to a transit packet router that demultiplexes the single optical channel for further transmission of each packet stream within a different optical channel; and when the failure is a failure of the transit packet router, the node operations are modified by:

modifying the packet-layer processing of an other packet router to cause that other packet router to generate two different optical channels for the first and second packet streams; and modifying the optical-layer processing of one or more OXCs to route the two different optical channels.

8. The invention of claim 7, wherein the one or more OXCs comprises an OXC that is part of the node having the failed transit packet router.

9. The invention of claim 7, wherein the modification of the node operations results in the reuse of optical wavelengths that were reserved for link or path restoration at the optical layer.

10. The invention of claim 7, wherein the node operations are modified to use network resources already reserved for pure single-layer service restoration.

11. The invention of claim 10, wherein the pure single-layer failure recovery is pure optical-layer service restoration.

12. The invention of claim 11, wherein the network resources include at least one of optical-layer optical channels and packet-layer ports.

13. A first node for a multi-layer network, the network being capable of operating at two or more different network layers, the network comprising a plurality of nodes, at least one node capable of operating at more than one network layer, wherein the network is adapted to:

detect the failure; and modify the operations of one or more of the nodes at two or more different network layers to restore at least some portion of the service affected by the failure by routing around the failure, wherein:

the multi-layer network is a packet-over-optical network having a packet layer and an optical layer;

one or more nodes are adapted to operate at both the packet and optical layers, each node adapted to operate at both the packet and optical layers comprises an optical cross-connect (OXC) and a packet router;

the node operations are modified by modifying optical-layer processing of at least one of the OXCs and modifying packet-layer processing of at least one of the packet routers;

prior to the failure, first and second packet streams are transmitted within a single optical channel to a transit packet router that demultiplexes the single optical channel for further transmission of each packet stream within a different optical channel; and when the failure is a failure of the transit packet router, the node operations are modified by:

modifying the packet-layer processing of an other packet router to cause that other packet router to generate two different optical channels for the first and second packet streams; and modifying the optical-layer processing of one or more OXCs to route the two different optical channels.

14. The invention of claim 13, wherein the first node is the at least one node.

15. The invention of claim 14, wherein the first node comprises an optical cross-connect (OXC) and a packet router.

16. An apparatus for restoring service after a failure in a multi-layer network capable of operating at two or more different network layers, the network comprising a plurality of nodes, at least one node capable of operating at more than one network layer, the apparatus comprising:

means for detecting the failure; and means for modifying the operations of one or more of the nodes at two or more different network layers to restore at least some portion of the service affected by the failure by routing round the failure, wherein:

the multi-layer network is a packet-over-optical network having a packet layer and an optical layer;

one or more nodes operate at both the packet and optical layers;

each node operating at both the packet and optical layers comprises an optical cross-connect (OXC) and a packet router;

the means for modifying the node operations comprises:

means for modifying optical-layer processing of at least one of the OXCs; and means for modifying packet-layer processing of at least one of the packet routers;

prior to the failure, first and second packet streams are transmitted within a single optical channel to a transit packet router that demultiplexes the single optical channel for further transmission of each packet stream within a different optical channel; and when the failure is a failure of the transit packet router, the means for modifying the node operations:

modifies the packet-layer processing of an other packet router to cause that other packet router to generate two different optical channels for the first and second packet streams; and modifies the optical-layer processing of one or more OXCs to route the two different optical channels.

17. The invention of claim 1, wherein, prior to the failure, the first and second packet streams share a single wavelength in the single optical channel.

18. The invention of claim 7, wherein, prior to the failure, the first and second packet streams share a single wavelength in the single optical channel.

19. The invention of claim 13, wherein, prior to the failure, the first and second packet streams share a single wavelength in the single optical channel.

20. The invention of claim 16, wherein, prior to the failure, the first and second packet streams share a single wavelength in the single optical channel.

* * * * *